United States Patent
Yang et al.

(10) Patent No.: US 11,821,980 B2
(45) Date of Patent: Nov. 21, 2023

(54) SATELLITE-FORMATION-BASED REMOTE SENSING SYSTEM AND CONSTELLATION SYSTEM

(71) Applicant: SPACETY CO., LTD (CHANGSHA), Changsha (CN)

(72) Inventors: Feng Yang, Changsha (CN); Weijia Ren, Changsha (CN); Zhigui Du, Changsha (CN); Xianfeng Chen, Changsha (CN)

(73) Assignee: SPACETY CO., LTD. (CHANGSHA), Changsha (CN)

( * ) Notice: Subject to any disclaimer, the term of this patent is extended or adjusted under 35 U.S.C. 154(b) by 26 days.

(21) Appl. No.: 17/637,744

(22) PCT Filed: Nov. 29, 2019

(86) PCT No.: PCT/CN2019/121956
§ 371 (c)(1),
(2) Date: Feb. 23, 2022

(87) PCT Pub. No.: WO2021/036066
PCT Pub. Date: Mar. 4, 2021

(65) Prior Publication Data
US 2022/0283295 A1 Sep. 8, 2022

(30) Foreign Application Priority Data

Aug. 23, 2019 (CN) .......................... 201910787398.0
Aug. 23, 2019 (CN) .......................... 201910788732.4

(51) Int. Cl.
*G01S 13/90* (2006.01)
*G01S 19/25* (2010.01)

(52) U.S. Cl.
CPC ......... *G01S 13/904* (2019.05); *G01S 13/9011* (2013.01); *G01S 13/9023* (2013.01); *G01S 19/258* (2013.01)

(58) Field of Classification Search
CPC .............. G01S 13/904; G01S 13/9011; G01S 13/9023; G01S 19/258
(Continued)

(56) References Cited

U.S. PATENT DOCUMENTS 3,824,466 A * 7/1974 Olier ..................... H04L 27/144
375/272
4,472,720 A * 9/1984 Reesor ..................... G01S 19/02
342/356

(Continued)

FOREIGN PATENT DOCUMENTS

| CN | 107064935 A | 8/2017 |
| CN | 10916448 A | 8/2018 |

(Continued)

OTHER PUBLICATIONS

Zhou, Peng, Doctoral Dissertation Database of China, "Research on the overall and synchronization technology of satellite-borne bistatic SAR system", 2009, vol. 11, pp. 1136-1187.

(Continued)

*Primary Examiner* — Nuzhat Pervin
(74) *Attorney, Agent, or Firm* — Smart & Biggar LP

(57) ABSTRACT

The present invention relates a remote sensing system, or particularly a satellite-formation-based remote sensing system, wherein comprising: a master satellite provided with an SAR system as a payload thereof, a first concomitant satellite, and a second concomitant satellite, wherein the first concomitant satellite and the second concomitant satellite fly around the master satellite, and the master satellite is located on major axes of motion trajectories of the first concomitant (Continued)

satellite and the second concomitant satellite, so as to define a first spatial baseline and a second spatial baseline that have an identical cross-track baseline component. The present invention enables high-precision, wide-range, three-dimensional imaging based on the satellite-formation, while acquires spatiotemporal features of variation of a ground region according to the synchronization in terms of time, frequency, and space.

13 Claims, 2 Drawing Sheets

(58) Field of Classification Search
USPC .......................................................... 342/25 F
See application file for complete search history.

(56) References Cited

U.S. PATENT DOCUMENTS

| | | | | |
|---|---|---|---|---|
| 4,707,659 | A * | 11/1987 | Kunz | G01R 33/446 |
| | | | | 324/309 |
| 5,810,297 | A * | 9/1998 | Basuthakur | B64G 1/244 |
| | | | | 701/13 |
| 6,005,509 | A * | 12/1999 | Buckreuss | G01S 13/86 |
| | | | | 349/189 |
| 6,781,540 | B1 * | 8/2004 | MacKey | G01S 13/90 |
| | | | | 342/25 A |
| 9,743,373 | B2 * | 8/2017 | Rudow | G01S 19/09 |
| 9,880,286 | B2 * | 1/2018 | Rudow | G01S 19/485 |
| 9,905,122 | B2 * | 2/2018 | Sloo | G08B 17/117 |
| 9,910,158 | B2 * | 3/2018 | Rudow | G01S 19/07 |
| 9,947,128 | B2 * | 4/2018 | Korb | G06V 20/647 |
| 11,385,347 | B2 * | 7/2022 | Maschhoff | H04B 7/195 |
| 2014/0077036 | A1 * | 3/2014 | Healy | B64G 1/242 |
| | | | | 244/158.8 |
| 2015/0346336 | A1 * | 12/2015 | Di Giorgio | B64G 1/405 |
| | | | | 342/25 C |
| 2015/0371431 | A1 * | 12/2015 | Korb | G06T 7/75 |
| | | | | 382/113 |
| 2017/0341779 | A1 * | 11/2017 | Healy | B64G 1/36 |
| 2018/0210090 | A1 * | 7/2018 | Soualle | G01S 19/396 |
| 2019/0304168 | A1 * | 10/2019 | Korb | G06V 10/60 |

FOREIGN PATENT DOCUMENTS

| | | | |
|---|---|---|---|
| CN | 109560862 A | 4/2019 | |
| CN | 110377047 A | 10/2019 | |
| CN | 110456349 A | 11/2019 | |
| CN | 110456350 A | 11/2019 | |
| CN | 110488292 A | 11/2019 | |
| CN | 110488293 A | 11/2019 | |
| EP | 2935010 B1 * | 3/2019 | ........... B64G 1/1021 |

OTHER PUBLICATIONS

English Translation of CN 10916448.
English translation of Abstract of Zhou, Peng, Doctoral Dissertation Database of China, "Research on the overall and synchronization technology of satellite-borne bistatic SAR system", 2009, vol. 11, pp. 1136-1187.
English translation of CN 110488293.
English translation of CN 110488292.
English translation of CN 110456350.
English translation of CN 110456349.
English translation of CN 110377047.
English translation of CN 109560862.
English translation of CN 107064935.

* cited by examiner

SATELLITE-FORMATION-BASED REMOTE SENSING SYSTEM AND CONSTELLATION SYSTEM

BACKGROUND OF THE INVENTION

1. Technical Field

The present invention relates to remote sensing technology, and more particularly to a satellite-formation-based remote sensing system and constellation system.

2. Description of Related Art

Satellite remote sensing system refers to the satellite platform equipped with sensors configured to carry out active/passive imaging observation of the earth, and to obtain various characteristic information of the earth in the form of digital images. Satellites equipped with synthetic aperture radars adopt the method of microwave active detection. Through the pulse compression in the range direction and the synthetic aperture technology in the azimuth direction, they can penetrate clouds, rain, fog, sandstorms, etc., and have the ability to work all-weather and all-day. It can realize high-resolution and wide-range imaging of the ground, and it is the most effective way to obtain data in cloudy and rainy areas all year round.

Different from optical remote sensing, synthetic aperture radar satellites can obtain complex images of the observation area, i.e., contain both intensity information and phase information. Through the synthetic aperture interferometry technology, the phase information of the radar complex image data can be extracted to invert the information about small changes of terrain and surface. This information makes synthetic aperture radar satellites have unique application value in the fields of land resources, earthquake, geology, disaster prevention and mitigation, agriculture, forestry, hydrology, surveying and mapping and military.

For example, the Chinese patent document with publication number CN108120981A discloses a shallow water depth radar remote sensing detection method, including: obtaining multi-view SAR remote sensing images in region to be detected, wherein multi-view SAR remote sensing images include q single-view SAR remote sensing images, and each single-view SAR remote sensing image contains the characteristics of image showing waves from deep water sea area to shallow water sea area in region to be detected; calculating each single-view SAR remote sensing image, respectively, so as to obtain the shallow water depth detection result in shallow water sea area; carrying out tidal correction respectively to the shallow water depth detection result obtained by each single-view SAR remote sensing image; composing the corrected shallow water depth detection result by element to form a one-dimensional shallow water depth array including q elements according to predetermined rule, filtering out every group of shallow water depth array by means of Kalman filtering algorithm, and taking the last one element numerical value in every filtered group of shallow water depth array as depth of the shallow water sea area. This patent employs a single radar-carrying satellite for synthetic aperture radar imaging, and uses multiple single-view SAR remote sensing images to achieve large-area, near-real-time shallow water underwater terrain detection, especially in shallow sea areas with high water color levels, cloudy and rainy, and inaccessible for ships.

For example, the Chinese patent document with publication number CN108053416A discloses a maximum oil reserve extraction systems based on a single satellite image, including: satellite remote sensing images browsing module, image subsection partition module, the automatic capture module of boundary point, oil tank shade height measuring module and oil reserve computing module; wherein the satellite remote sensing images browsing module is used to obtain human-machine interactive information when processing the satellite remote sensing images; the image subsection partition module is used to extract the contour edge of oil tank target, and facilitate to choose key point; the automatic capture module of boundary point is used for the auxiliary selection of the key point on arc side; the oil tank shade height measuring module is used to calculate the height of oil tank based on the oil tank shadow information. In this patent, accurate extraction of tank elevation can be carried out based on a single satellite image, calculation error caused by manually determining the arc points of the same name is effectively prevented, and the extraction rate of tank elevation is greatly improved.

However, the abovementioned patents use a single SAR satellite for remote sensing imaging, which obtains limited terrain features, limited resolution, and limited mapping width. For example, the height information of the ground in a single satellite image is insufficient, and the extracted height of the oil tank is not accurate enough. In addition, the image resolution is limited, and the obtained contour, shadow and other information are not accurate enough. Using inaccurate image information, even if the calculation error caused by manually determining the arc point of the same name is avoided, accurate height information cannot be obtained. However, the use of multiple single-view SAR remote sensing images to realize underwater terrain detection in shallow water cannot avoid the time synchronization problem of multiple single-view SAR remote sensing images, which means that multiple single-view SAR remote sensing images obtained under from single satellite are discontinuous in terms of time and azimuth direction, and the water depth information contained therein captured at different times cannot guarantee the real-time detection of shallow water underwater detection. In addition, for a single synthetic aperture radar satellite, the resolution of the image and the mapping width are contradictory, thus it is impossible to maintain high resolution while wide-range imaging. Therefore, in the case of large-scale shallow water imaging, only a relative low resolution imaging can be maintained, which is not conducive to subsurface detection in shallow sea water. Distributed synthetic aperture radar systems based on satellite formation or constellation set up receiving antennas on different satellites to achieve separated transmit-receiving platforms, so as to not only have a long inter-satellite space baseline, but also to improve spatial resolution and obtain high-precision, wide-range images by combining multiple low-resolution wide-range synthetic aperture radar images. The distributed synthetic aperture radar satellite system can generate at least two complex images, and due to the existence of the inter-satellite space baseline, it can provide more terrain phase information during the interference processing of the two complex images, which provides conditions for the realization of high-precision, wide-range remote sensing imaging of the three-dimensional scenes.

For example, the Chinese patent document with publication number CN108557114A involves a distributed remote sensing satellites comprising a service satellite and six remote sensing unit satellites, and distributed formation mode or synthetic aperture integrated mode can be used in the service satellite and remote sensing unit satellites. By distributed satellites technology, this application realizes a quick design, development and in-orbit application of modular satellites, uses cost-effective satellite system to achieve high-performance remote sensing of the earth, and implements synthetic aperture imaging through in-orbit autonomous combination, thereby improving spatial resolution and maximally utilizing space resources.

For example, the Chinese patent document with publication number CN104297751B involves a major-minor SAR image fusion method of distributed satellite SAR system, concretely comprising the following steps: Doppler spectral envelope correction; image registration using radar geometric method; landform phase-retrieval; estimation of registration error and residual phase deviation using SAR image maximum-contrast method; fine registration and phase deviation correction of major-minor SAR image; and Doppler spectrum splicing. This application can carry out effective image co-registration to major-minor SAR image to improve azimuth direction resolution in the case of being approximately zero in the Doppler spectrum overlap degree of the distributed satellite SAR system with long along-track baselines, so as to meet the performance requirement of high-quality interferometric synthetic aperture radar processing.

However, the distributed remote sensing satellites provided by the above patents do not take into account the time synchronization between satellites in formation, and cannot guarantee that the two satellites cover the same area of the ground at the same time, resulting in a decrease in the interference performance of the two complex images, or even failure to form interference. At the same time, the asynchrony of time also makes it impossible for remote sensing satellites to acquires spatiotemporal features of variation of a ground region according to time information. Moreover, when the distributed synthetic aperture radar system interferes with two complex images, the obtained phase difference is the main value of the phase wrapped by an unknown integer period between $[-\pi, \pi]$, and the phase needs to be expanded, but the time asynchrony between the two satellites will lead to errors in phase unwrapping. Besides, the phase information contains the height information of the terrain, so that the remote sensing system cannot obtain accurate three-dimensional scene images.

In addition, in the prior art, such as the Chinese patent document of publication number CN107395309 discloses a high-accuracy method for relative ranging and time synchronizing based on inter-satellite link, including: establishing inter-satellite link on the basis of the respective satellite frequency marking of two satellites A, B respectively, including the speed testing information and clocking error into dynamic error model; having two satellites of A, B captured, tracked and demodulated the signal received from each other in time slot respectively, recovering information frame, and calculating local pseudo-range based on sending epoch time in measurement time slot from each other; finally having satellite A and satellite B embedded the amended pseudo-range into local base band data respectively and sent it to each other, using locally measured amended pseudo-range and receiving the other's amended pseudo-range demodulated from information frame independently, calculating relative distance value between satellites and the time difference, exerting clock adjustment on the two satellites and correcting satellite ephemeris and clock parameter. However, this patent only considers time synchronization, but not the interference phase error caused by the frequency drift of the receiving device on the satellite platform, nor does it consider the problem of inconsistent antenna angles, resulting in beams not covering the same area.

Hence, it is desirable to make improvement to the prior art by providing a satellite-formation-based synthetic aperture radar, which compensates phase unwrapping errors through time, frequency, and space synchronization so as to improve accuracy of terrain altitude measurement and acquires spatiotemporal features of variation of a ground region according to the synchronization in terms of time, frequency, and space, while providing high-precision, wide-range, three-dimensional imaging.

SUMMARY OF THE INVENTION

To address the technical problems of the prior art, the present invention provides a remote sensing system, or particularly a satellite-formation-based remote sensing system, comprising: a master satellite provided with an SAR system as a payload thereof, a first concomitant satellite, and a second concomitant satellite, wherein the first concomitant satellite and the second concomitant satellite fly around the master satellite, and the master satellite is located on major axes of motion trajectories of the first concomitant satellite and the second concomitant satellite, so as to define a first spatial baseline A and a second spatial baseline B that have an identical cross-track baseline component.

Advantageously, the master satellite is provided with an imaging and sensing device and a synchronizing device as payloads thereof, wherein the synchronizing device forms the first spatial baseline A and the second spatial baseline B in time series based on synchronization in terms of time, frequency, and space; and wherein the imaging and sensing device acquires spatiotemporal features of variation of a ground region according to the first spatial baseline A and the second spatial baseline B.

Advantageously, a third concomitant satellite is located outside the motion trajectories of the first concomitant satellite and the second concomitant satellite to fly with the master satellite in a tandem formation, and is provided with an imaging and sensing device and a synchronizing device as payloads thereof, wherein the third concomitant satellite is located on an orbit adjacent to the master satellite, so that the third concomitant satellite defines a long along-track baseline C and a short cross-track baseline D with respect to the master satellite. The imaging and sensing device performs optimal interferometric baseline processing based on the first spatial baseline A and the second spatial baseline B as well as the short cross-track baseline D and the long along-track baseline C, so as to obtain terrain elevation information and moving target velocity information while performing high-precision, wide-range imaging.

Advantageously, the imaging and sensing device further comprises a measuring device configured to measure satellite attitude parameters of the master satellite, the first concomitant satellite, the second concomitant satellite, and the third concomitant satellite on a real-time basis, and to perform precise orbit determination so as to acquire the first spatial baseline A, the second spatial baseline B, the long along-track baseline C, and the short cross-track baseline D with high precision.

Advantageously, the imaging and sensing device is further configured to obtain priori information about a ground target region using the measuring device, and to adjust antenna angles of the imaging and sensing devices of the master satellite, the third concomitant satellite, the first concomitant satellite, and the second concomitant satellite based on latitude information of the ground target region, so as to keep a constant elevation ambiguity, thereby enhancing consistency of precision for measuring ground elevations in regions at different latitudes.

Advantageously, when terrain altitude of the ground target region obtained based on the priori information shows a large amplitude of variation, the antenna angles of the imaging and sensing devices of the master satellite, the third concomitant satellite, the first concomitant satellite, and the second concomitant satellite are adjusted to keep a second elevation ambiguity that is constant and different from the first elevation ambiguity, so that the SAR system performs at least twice imaging with the two different elevation ambiguities.

Advantageously, when the third concomitant satellite is synchronized in virtue of the synchronizing device, the first spatial baseline A, the second spatial baseline B, the short cross-track baseline D, and the long along-track baseline C define an along-track baseline and a cross-track baseline in time series, wherein the imaging and sensing device acquires variation information of velocity over time of a moving target based on an along-track tangent in time series, and acquires variation information of the ground elevations over time based on the cross-track baselines in time series.

Advantageously, when orbital parameters of the master satellite are given, orbital parameters of the first concomitant satellite and the second concomitant satellite are obtained by comparing lengths of the effective cross-track baselines and limit lengths of the cross-track effective baseline of the first spatial baseline A and the second spatial baseline B and adjusting a semi-minor axes of flight paths of the first concomitant satellite and the second concomitant satellite, and orbital parameters of the third concomitant satellite are obtained based on requirements of spatial sampling for azimuth Doppler ambiguity resolution and requirements of precision of Doppler ambiguity resolution.

Advantageously, the synchronizing device at least comprises a time synchronization module, a frequency synchronization module, and a space synchronization module, wherein the time synchronization module is configured to: trigger timing pulse signals carried by the satellites when started up and obtain frequency differences among the satellites through frequency-synchronized pulses among the satellites thereby achieving time synchronization.

Preferably, the frequency synchronization module in the synchronizing device is configured to: use a linear frequency-modulated signal as a synchronizing pulse to switch synchronizing pulse signal processing of the master satellite and the first concomitant satellite or the second concomitant satellite or the third concomitant satellite periodically, so as to obtain phase differences caused by satellite frequency sources, thereby performing phase compensation to achieve frequency synchronization.

Advantageously, the space synchronization module in the synchronizing device is configured to: point the imaging and sensing device of the first concomitant satellite or the second concomitant satellite or the third concomitant satellite to the same ground target region based on a direction of the imaging and sensing device of the master satellite with respect to the ground target region and the satellite attitude of the first concomitant satellite or the second concomitant satellite or the third concomitant satellite, thereby achieving space synchronization.

The present invention further provides a satellite-borne SAR constellation system, comprising a master satellite provided with an SAR system as a payload thereof, and at least a pair consisting of first concomitant satellite and second concomitant satellite flying around the master satellite, wherein the first concomitant satellite and the second concomitant satellite fly around the master satellite and the master satellite is located on major axes of motion trajectories of the first concomitant satellite and the second concomitant satellite so as to define a first spatial baseline A and a second spatial baseline B having identical cross-track baseline components, wherein the first concomitant satellite and the second concomitant satellite form a passively stable configuration with respect to the master satellite in a centrosymmetric manner, so that the first concomitant satellite defines the first spatial baseline A with respect to the master satellite, and the second concomitant satellite defines the second spatial baseline B with respect to the master satellite, and wherein the first spatial baseline A and the second spatial baseline B are identical in terms of length and are opposite in terms of phase.

Advantageously, the satellite-borne SAR constellation system further comprises a third concomitant satellite, wherein the third concomitant satellite is located outside a flying orbit of the first concomitant satellite and the second concomitant satellite and is on an orbit adjacent to the master satellite so as to fly with the first master satellite in a tandem formation, thereby defining a long along-track baseline C and a short cross-track baseline D with respect to the master satellite; and wherein the SAR system defines a long vertical baseline greater than the short cross-track baseline D in terms of length and a short horizontal baseline smaller than the long along-track baseline C in terms of length based on the first spatial baseline A and the second spatial baseline B, and performs optimal interferometric signal processing combined with the short cross-track baseline D and long along-track baseline C, so as to perform high-resolution, wide-swath imaging with improved terrain altitude measurement in terms of precision and range.

Advantageously, after orbital parameters of the master satellite, the third concomitant satellite, the first concomitant satellite, and the second concomitant satellite are obtained, the master satellite acquires attitude parameters of an SAR radar antenna using a measuring device, so as to perform precise orbit determination on the master satellite, the third concomitant satellite, the first concomitant satellite, and the second concomitant satellite, thereby acquiring the first spatial baseline A, the second spatial baseline B, the long along-track baseline C and the short cross-track baseline D with high precision, wherein the measuring device at least comprises a GPS receiver that performs attitude measurement through steps of:
pre-processing raw data, primarily including decoding ephemeris data and synchronizing data;
acquiring location parameters of the SAR radar antenna using a differential positioning algorithm;
obtaining an initial value of integer ambiguity using location parameters of the SAR radar antenna, figuring out a precise value of the integer ambiguity by means of Kalman Filter and recursive search, and obtaining precise coordinates using carrier phases; and
obtaining an inter-satellite baseline vector using the obtained precise coordinates, and obtaining the attitude parameter of the SAR radar antenna using the inter-satellite baseline vector.

The present invention further provides a satellite remote sensing system, comprising a master satellite provided with an SAR system as a payload thereof, a third concomitant satellite, and at least a pair consisting of first concomitant satellite and second concomitant satellite flying around the master satellite, wherein after the master satellite obtains attitude parameters of the SAR radar antenna, the GPS receiver at least acquires priori information about lunisolar gravitational perturbation, solar radiation pressure perturbation, and atmospheric drag perturbation based on orbital parameters of the master satellite, the third concomitant satellite, the first concomitant satellite, and the second concomitant satellite and its connection with a GPS constellation, and building an orbit perturbation model of a constellation system so as to eliminate effects of the perturbations on baseline measurement; and wherein the GPS receiver define a first spatial baseline A, a second spatial baseline B, a long along-track baseline C, and a short cross-track baseline D based on an orbit determination result obtained through the orbit perturbation model of the constellation system and the attitude parameters of the SAR radar antenna.

To address the technical problems of the prior art, the present invention provides a satellite-formation-based remote sensing system, wherein the master satellite is located on major axes of motion trajectories of the first concomitant satellite and the second concomitant satellite, and the third concomitant satellite flies with the master satellite in a tandem formation, so as to define a first spatial baseline A and a second spatial baseline B that are identical in terms of length and are opposite in terms of phase. Thus, the problem that the obtained ground altitude information has radial velocity information mixed in its phase caused by coupling between the first spatial baseline A and the second spatial baseline B due to the along-track baseline and the cross-track baseline can be prevented, thereby enhancing precision of terrain altitude measurement. Besides, the present invention uses the synchronizing devices to form the along-track baseline and the cross-track baselines in time series based on synchronization in terms of time, frequency, so as to obtain synchronization information about time and frequency, thereby calibrating the received signals, and uses the long and short cross-track baselines to perform phase unwrapping, so as to enhance precision in both phase unwrapping and terrain altitude measurement, thereby being able to recognize subtle variation in terms of elevation and velocity over time in a ground region.

Advantageously, a satellite-formation-based remote sensing system comprises a master satellite provided with an imaging and sensing device and a synchronizing device as payloads thereof, a first concomitant satellite, and a second concomitant satellite. The first concomitant satellite and the second concomitant satellite fly around the master satellite, and the master satellite is located on major axes of motion trajectories of the first concomitant satellite and the second concomitant satellite, so as to define a first spatial baseline A and a second spatial baseline B that have an identical cross-track baseline component. The synchronizing device forms the first spatial baseline A and the second spatial baseline B in time series based on synchronization in terms of time, frequency, and space, so that the imaging and sensing device can acquire spatiotemporal features of variation of a ground region.

Advantageously, a third concomitant satellite is located outside the motion trajectories of the first concomitant satellite and the second concomitant satellite to fly with the master satellite in a tandem formation, and is provided with an imaging and sensing device and a synchronizing device as payloads thereof. The third concomitant satellite is located on an orbit adjacent to the master satellite, so that the third concomitant satellite defines a long along-track baseline C and a short cross-track baseline D with respect to the master satellite. The imaging and sensing device performs optimal interferometric baseline processing based on the first spatial baseline A and the second spatial baseline B as well as the short cross-track baseline D and the long along-track baseline C, so as to obtain terrain elevation information and moving target velocity information while performing high-precision, wide-range imaging.

Advantageously, when the third concomitant satellite is synchronized in virtue of the synchronizing device, the first spatial baseline A, the second spatial baseline B, the short cross-track baseline D, and the long along-track baseline C define an along-track baseline and a cross-track baseline in time series. The imaging and sensing device acquires information of velocity over time of a moving target based on an along-track tangent in time series, and acquires information of the ground elevations over time based on the cross-track baselines in time series.

Advantageously, when orbital parameters of the master satellite are given, orbital parameters of the first concomitant satellite and the second concomitant satellite are obtained by comparing lengths of the effective cross-track baselines and limit lengths of the cross-track effective baseline of the first spatial baseline A and the second spatial baseline B and adjusting a semi-minor axes of flight paths of the first concomitant satellite and the second concomitant satellite. Orbital parameters of the third concomitant satellite are obtained based on requirements of spatial sampling for azimuth Doppler ambiguity resolution and requirements of precision of Doppler ambiguity resolution.

Advantageously, the synchronizing device at least comprises a time synchronization module, a frequency synchronization module, and a space synchronization module, wherein the time synchronization module is configured to: trigger timing pulse signals carried by the satellites when started up and obtain frequency differences among the satellites through frequency-synchronized pulses among the satellites thereby achieving time synchronization.

Advantageously, the frequency synchronization module in the synchronizing device is configured to: use a linear frequency-modulated signal as a synchronizing pulse to switch synchronizing pulse signal processing of the master satellite and the first concomitant satellite or the second concomitant satellite or the third concomitant satellite periodically, so as to obtain phase differences caused by satellite frequency sources, thereby performing phase compensation to achieve frequency synchronization.

Advantageously, the space synchronization module in the synchronizing device is configured to: point the imaging and sensing device of the first concomitant satellite or the second concomitant satellite or the third concomitant satellite to the same ground target region based on a direction of the imaging and sensing device of the master satellite with respect to the ground target region and the satellite attitude of the first concomitant satellite or the second concomitant satellite or the third concomitant satellite, thereby achieving space synchronization.

Advantageously, the imaging and sensing device further comprises a measuring device configured to measure satellite attitude parameters of the master satellite, the first concomitant satellite, the second concomitant satellite, and the third concomitant satellite on a real-time basis, and to perform precise orbit determination so as to acquire the first spatial baseline A, the second spatial baseline B, the long along-track baseline C, and the short cross-track baseline D with high precision.

Advantageously, the imaging and sensing device is further configured to obtain priori information about a ground target region using the measuring device, and to adjust antenna angles of the imaging and sensing devices of the master satellite, the third concomitant satellite, the first concomitant satellite, and the second concomitant satellite based on latitude information of the ground target region, so as to keep a constant elevation ambiguity, thereby enhancing consistency of precision for measuring ground elevations in regions at different latitudes.

Advantageously, when terrain altitude of the ground target region obtained based on the priori information shows a large amplitude of variation, the antenna angles of the imaging and sensing devices of the master satellite, the third concomitant satellite, the first concomitant satellite, and the second concomitant satellite are adjusted to keep a second elevation ambiguity that is constant and different from the first elevation ambiguity, so that the SAR system performs at least twice imaging with the two different elevation ambiguities.

To address the technical problems of the prior art, the present invention provides a satellite-borne SAR constellation system, wherein the first concomitant satellite and the second concomitant satellite form a passively stable orbital configuration with respect to the master satellite in a centrosymmetric manner, so that the first concomitant satellite and the second concomitant satellite can define the first spatial baseline A and the second spatial baseline B that are identical in terms of length and are opposite in terms of phase respectively with respect to the master satellite at any time in the orbital period. Based on a long vertical baseline containing terrain altitude information and a short horizontal baseline containing velocity information obtained by decoupling between the first spatial baseline A and the second spatial baseline B, and combined with the long along-track baseline C and short cross-track baseline D formed between the third concomitant satellite and the master satellite, the SAR system can perform optimal interferometric signal processing according to the long vertical baseline, the short cross-track baseline D, the long along-track baseline C and the short horizontal baseline, so as to perform high-resolution, wide-swath imaging with improved terrain altitude measurement in terms of precision and range.

Advantageously, a satellite-borne SAR constellation system comprises a master satellite provided with an SAR system as a payload thereof, a third concomitant satellite and at least a pair consisting of first concomitant satellite and second concomitant satellite flying around the master satellite. The first concomitant satellite and the second concomitant satellite form a passively stable configuration with respect to the master satellite in a centrosymmetric manner, so that the first concomitant satellite defines the first spatial baseline A with respect to the master satellite, and the second concomitant satellite defines the second spatial baseline B with respect to the master satellite. The first spatial baseline A and the second spatial baseline B are identical in terms of length and are opposite in terms of phase. The third concomitant satellite is located outside a flying orbit of the first concomitant satellite and the second concomitant satellite and is on an orbit adjacent to the master satellite so as to fly with the first master satellite in a tandem formation, thereby defining a long along-track baseline C and a short cross-track baseline D with respect to the master satellite. The SAR system defines a long vertical baseline greater than the short cross-track baseline D in terms of length and a short horizontal baseline smaller than the long along-track baseline C in terms of length based on the first spatial baseline A and the second spatial baseline B, and performs optimal interferometric signal processing combined with the short cross-track baseline D and long along-track baseline C, so as to perform high-resolution, wide-swath imaging with improved terrain altitude measurement in terms of precision and range.

Advantageously, the orbital parameters of the third concomitant satellite are obtained through the following steps. According to task requirements, orbital parameters of the master satellite are obtained, wherein the eccentricity of orbit of the master satellite is 0. The first concomitant satellite and the second concomitant satellite are identical to the master satellite in terms of semi-major axis, orbit inclination, and right ascension of ascending node. The semi-minor axes and the semi-major axes of the flight paths of the first concomitant satellite and the second concomitant satellite are figured out using Hill equations. Therein, design values of the semi-minor axes of the flight path of the first concomitant satellite and the second concomitant satellite are the baseline requirements of the task. According to the phase difference between the flight paths of the first concomitant satellite and the second concomitant satellite, argument of perigee and mean anomaly can be obtained. According to the obtained orbital parameters of all the satellites, the effective cross-track baseline lengths of the first spatial baseline A and the second spatial baseline B in an orbit period are obtained. The next step is to determine whether they are smaller than the critical baseline length of the cross-track effective baseline. If they are not smaller than the critical baseline length of the cross-track effective baseline, the semi-minor axes of the flight paths of the first concomitant satellite and the second concomitant satellite are adjusted, until the effective cross-track baseline lengths of the first spatial baseline A and the second spatial baseline B satisfy requirements. According to the orbital parameters of the master satellite, the first concomitant satellite, and the second concomitant satellite obtained through the foregoing process, orbital parameters of the third concomitant satellite that allow the long along-track baseline C to meet requirements for spatial sampling for azimuth Doppler ambiguity resolution and allow the short cross-track baseline D to meet requirements for precision if Doppler ambiguity resolution can be figured out.

Advantageously, after orbital parameters of the master satellite, the third concomitant satellite, the first concomitant satellite, and the second concomitant satellite are obtained, the master satellite acquires attitude parameters of an SAR radar antenna using a measuring device, so as to perform precise orbit determination on the master satellite, the third concomitant satellite, the first concomitant satellite, and the second concomitant satellite, thereby acquiring the first spatial baseline A, the second spatial baseline B, the long along-track baseline C and the short cross-track baseline D with high precision. The measuring device at least comprises a GPS receiver that performs attitude measurement through steps of: pre-processing raw data, primarily including decoding ephemeris data and synchronizing data; acquiring location parameters of the SAR radar antenna using a differential positioning algorithm; obtaining an initial value of integer ambiguity using location parameters of the SAR radar antenna, figuring out a precise value of the integer ambiguity by means of Kalman Filter and recursive search, and obtaining precise coordinates using carrier phases; and obtaining an inter-satellite baseline vector using the obtained precise coordinates, and obtaining the attitude parameter of the SAR radar antenna using the inter-satellite baseline vector.

Advantageously, after the master satellite obtains attitude parameters of the SAR radar antenna, the GPS receiver at least acquires priori information about lunisolar gravitational perturbation, solar radiation pressure perturbation, and atmospheric drag perturbation based on orbital parameters of the master satellite, the third concomitant satellite, the first concomitant satellite, and the second concomitant satellite and its connection with a GPS constellation, and building an orbit perturbation model of a constellation system so as to eliminate effects of the perturbations on baseline measurement; and the GPS receiver define a first spatial baseline A, a second spatial baseline B, a long along-track baseline C, and a short cross-track baseline D based on an orbit determination result obtained through the orbit perturbation model of the constellation system and the attitude parameters of the SAR radar antenna.

Advantageously, before acquiring priori information through the GPS constellation, the master satellite achieves time synchronization firstly so as to avoid the problems caused by clock error. The master satellite, the third concomitant satellite, the first concomitant satellite, and the second concomitant satellite all contain a synchronizing device, which at least comprises a time synchronization module. The time synchronization module is configured to: trigger timing pulse signals carried by the satellites when started up and obtain frequency differences among the satellites through frequency-synchronized pulses among the satellites thereby achieving time synchronization.

Advantageously, the synchronizing device further comprises a frequency synchronization component. The frequency synchronization component is configured to: periodically interrupt acquisition of any two onboard SAR information using frequency linear time-variant signals as the synchronization pulses, and process the exchanged synchronization pulse signals to obtain phase difference caused by frequency sources on any two satellites. Performing phase compensation to the SAR based on the phase difference to achieve frequency synchronization.

Advantageously, when the master satellite is synchronized with the third concomitant satellite and/or the first concomitant satellite and/or the second concomitant satellite in virtue of the synchronizing device, the first spatial baseline A, the second spatial baseline B, the long along-track baseline C and the short cross-track baseline D define a horizontal baseline and a vertical baseline in time series.

Advantageously, after acquiring priori information through the synchronizing device and GPS constellation connection, the master satellite obtains the latitude information of the ground target region according to the priori information of the GPS constellation, and adjusts antenna angles of the third concomitant satellite, the first concomitant satellite, and the second concomitant satellite, so as to keep a constant elevation ambiguity, thereby enhancing consistency of precision for measuring ground elevations in regions at different latitudes.

Advantageously, a satellite-borne SAR imaging method comprises the following steps. A master satellite provided with an SAR system as a payload thereof, a third concomitant satellite and at least a pair consisting of first concomitant satellite and second concomitant satellite flying around the master satellite are used for imaging. The first concomitant satellite and the second concomitant satellite form a passively stable configuration with respect to the master satellite in a centrosymmetric manner, so that the first concomitant satellite and the second concomitant satellite can define the first spatial baseline A and the second spatial baseline B that are identical in terms of length and are opposite in terms of phase respectively with respect to the master satellite. The third concomitant satellite is located outside a flying orbit of the first concomitant satellite and the second concomitant satellite and is on an orbit adjacent to the first master satellite so as to fly with the first master satellite in a tandem formation, thereby defining a long along-track baseline C and a short cross-track baseline D with respect to the first master satellite. The SAR system defines a long vertical baseline and a short horizontal baseline based on the first spatial baseline A and the second spatial baseline B, and performs optimal interferometric signal processing combined with the short cross-track baseline D and long along-track baseline C, so as to perform high-resolution, wide-swath imaging with improved terrain altitude measurement in terms of precision and range.

Advantageously, after acquiring priori information through the synchronizing device and GPS constellation connection, the master satellite obtains the latitude information of the ground target region according to the priori information of the GPS constellation, and adjusts antenna angles of the SAR system on the master satellite, the third concomitant satellite, the first concomitant satellite, and the second concomitant satellite, so as to keep a constant elevation ambiguity, thereby enhancing consistency of precision for measuring ground elevations in regions at different latitudes. After having the antenna angles of the SAR system on the master satellite, the third concomitant satellite, the first concomitant satellite, and the second concomitant satellite kept a constant first elevation ambiguity and performing once imaging, when terrain altitude of the ground target region obtained based on the priori information shows a large amplitude of variation, the antenna angles of the SAR system on the master satellite, the third concomitant satellite, the first concomitant satellite, and the second concomitant satellite are adjusted to keep a second elevation ambiguity that is constant and different from the first elevation ambiguity, so that the SAR system performs at least twice imaging with the two different elevation ambiguities.

The beneficial technical effects of the present invention include one or more of the following:
1. The problem that the obtained ground altitude information has radial velocity information mixed in its phase caused by coupling between the first spatial baseline A and the second spatial baseline B due to the along-track baseline and the cross-track baseline can be prevented, thereby enhancing precision of terrain altitude measurement;
2. Temporal and spatial synchronization helps ensure that main beams of two satellites cover the same ground region at the same time, and helps ensure that two satellites receive return signals in the same time window; and frequency synchronization helps reduce interferometric phase errors caused by respective frequency drifts of the two satellites;
3. The long along-track baseline C, the first spatial baseline A, and the second spatial baseline B include information of radial velocity, which enables the system to measure moving targets, while the long along-track baseline C and the short along-track baseline can further provide spatial sampling required by azimuth Doppler ambiguity resolution, thereby compensating short sampling time caused by repetition frequency at low azimuth, enabling azimuth Doppler ambiguity resolution, and in turn achieving high-precision, wide-range imaging;

4. Since the short cross-track baseline D is less precise for altitude measurement, phase unwrapping based on the long cross-track baseline components of the first spatial baseline A and the second spatial baseline B may have errors, but the present invention uses the along-track baseline and the cross-track baselines in time series to obtain synchronization information about time and frequency, thereby calibrating the received signals, and uses the long and short cross-track baselines to perform phase unwrapping, so as to enhance precision in both phase unwrapping and terrain altitude measurement, thereby being able to recognize subtle variation in terms of elevation and velocity over time in a ground region.

| List of Reference Numbers | |
|---|---|
| 100: master satellite | 101: third concomitant satellite |
| 200: first concomitant satellite | 201: second concomitant satellite |
| 300: imaging and sensing device | 400: synchronizing device |
| 310: measuring device | 410: time synchronization module |
| 420: frequency synchronization module | 430: space synchronization module |
| A: first spatial baseline | B: second spatial baseline |
| C: long along-track baseline | D: short cross-track baseline |

DETAILED DESCRIPTION OF THE INVENTION

Figure 1:
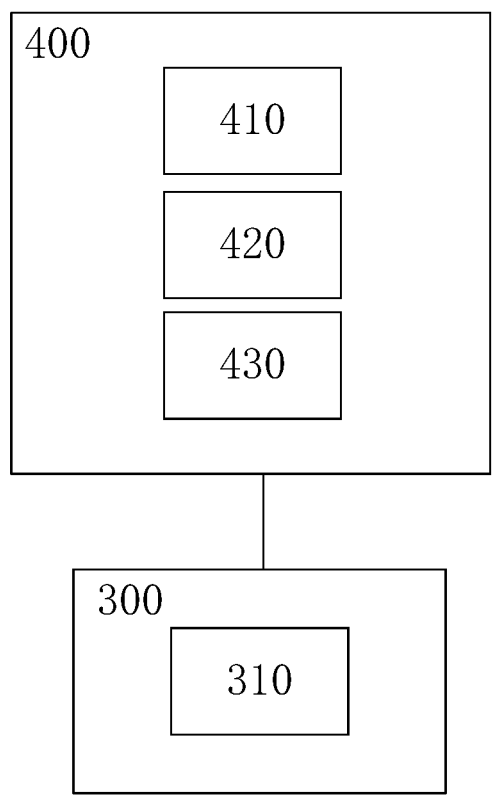
FIG. 1 is a schematic module diagram of a preferred imaging and sensing device and a synchronizing device of the present invention.
Figure 2:
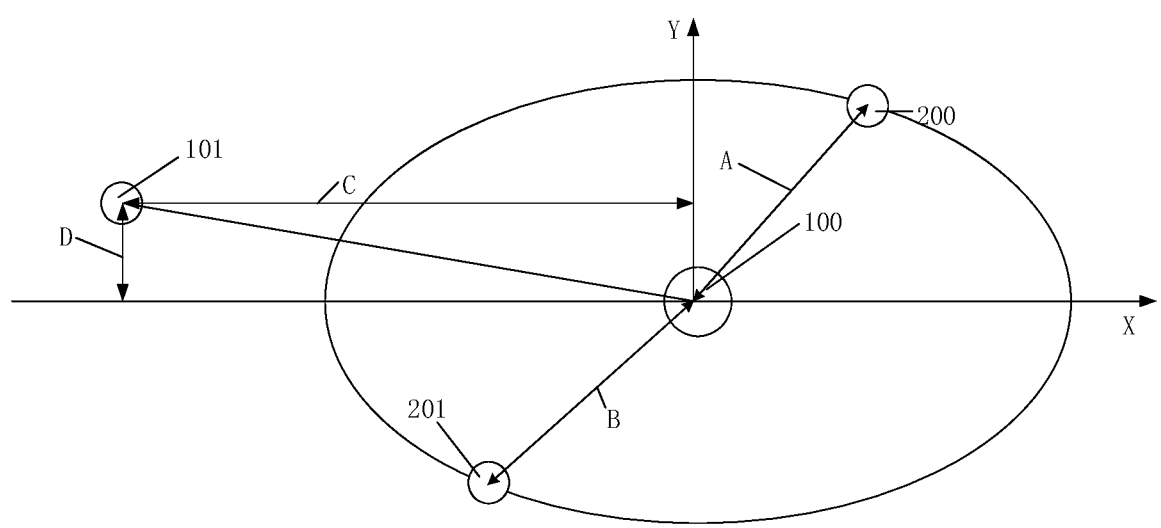
FIG. 2 is a schematic geometry diagram of a preferred satellite formation of the present invention.

A detailed description will be given below in conjunction with FIG. 1 and FIG. 2. Each "module" in the present invention may be one or more of dedicated integrated chips, servers, and server groups, respectively. A module of the present invention describes any hardware, software, or any combination thereof capable of performing the functions associated with the "module".

According to a feasible mode, the present invention discloses a remote sensing imaging method, which may also be a satellite-based remote sensing imaging method, a distributed-synthetic-aperture-radar-based remote sensing imaging method, or a satellite-formation-based remote sensing imaging method. The remote sensing imaging method can be realized by the system of the present invention and/or other alternative components. For example, a system in the method can be achieved by using various components in the system of the present invention. The entire and/or partial contents of the preferred implementations of other embodiments may be used as supplements to this embodiment unless conflicts or contradictions are caused.

Advantageously, the imaging method includes a master satellite 100 provided with an imaging and sensing device 300 and a synchronizing device 400 as payloads thereof, a first concomitant satellite 200, and a second concomitant satellite 201. The first concomitant satellite 200 and the second concomitant satellite 201 fly around the master satellite 100, and the master satellite 100 is located on major axes of motion trajectories of the first concomitant satellite 200 and the second concomitant satellite 201, so as to define a first spatial baseline A and a second spatial baseline B that have an identical cross-track baseline component. The synchronizing device 400 forms the first spatial baseline A and the second spatial baseline B in time series based on synchronization in terms of time, frequency, and space, thereafter the imaging and sensing device 300 can acquires spatiotemporal features of variation of a ground region. Preferably, the imaging and sensing device 300 at least comprises an imaging sensor that is configured to acquire ground information actively or passively. Such an imaging sensor may be any device capable of imaging, such as a radar or a laser. The imaging sensor may be a sensor capable of imaging by means of the synthetic aperture technology, such as a synthetic aperture radar or a synthetic aperture laser radar. Preferably, the first concomitant satellite 200 and the second concomitant satellite 201 move along the same orbit having the master satellite 100 at its center, and are designed flowing Hill equations so as to have a passively stable configuration that does not consume fuel. As shown in FIG. 2, the motion trajectory of the first concomitant satellite 200 and the second concomitant satellite 201 is described as an elliptic trajectory by the Hill equations. Since the master satellite 100, the first concomitant satellite 200, and the second concomitant satellite 201 orbit in the same orbit plane, the first concomitant satellite 200 and the second concomitant satellite 201 have the same orbit period, the same semi-major axis, and the same eccentricity. There is no location shift in the horizontal direction among the satellites, so that the first concomitant satellite 200 and the second concomitant satellite 201 form an elliptic spatial configuration in the space. Thereby, in the present invention, the first concomitant satellite 200 and the second concomitant satellite 201 can be kept at relative spatial locations with respect to the master satellite 100, thereby allowing the first spatial baseline A and the second spatial baseline B defined thereby to remain stable. Furthermore, the first spatial baseline A and the second spatial baseline B change periodically with rotation of the elliptic configuration, so that the first spatial baseline A and the second spatial baseline B are mixed baselines contain both velocity information and terrain altitude information.

Preferably, the imaging devices 300 of the master satellite 100, the first concomitant satellite 200, and the second concomitant satellite 201 receive return signals of signals transmitted to a ground target by the master satellite 100. Synthetic aperture radar imaging sensor in the imaging devices 300 obtain plural synthetic aperture radar images of a ground target by means of low-azimuth repeated sampling, and then the plural synthetic aperture radar images can be stitched into a high-precision, wide-range synthetic aperture radar image. The first spatial baseline A and the second spatial baseline B contain phases of velocity information and terrain altitude information, which enable high-precision, wide-range, three-dimensional imaging.

Preferably, the first spatial baseline A and the second spatial baseline B, with the master satellite 100 located on their major axis, have cross-track baseline components that have the same length but have opposite phases. Therefore, it is possible to get a cross-track baseline only containing terrain altitude information and an along-track baseline only containing velocity information by means of, for example, differential processing. With this approach, the present invention can at least realize the technical benefit of preventing the problem that the obtained ground altitude information has radial velocity information mixed in its phase caused by coupling between the first spatial baseline A and the second spatial baseline B due to the along-track baseline and the cross-track baseline can be prevented, thereby enhancing precision of terrain altitude measurement.

Preferably, the first spatial baseline A and the second spatial baseline B can be synchronized in terms of time, frequency, and space based on their synchronizing devices 400, so as to obtain the first spatial baseline A and the second spatial baseline B in time series, thereby obtaining the along-track baseline and the cross-track baseline in time series. Preferably, the spatiotemporal features refer to the information of ground elevation, varying over time, contained in the cross-track baseline of the time series, and the information of velocity of a target, varying over time, contained in the along-track baseline of the time series. The present invention may be used to identify subtle variation in altitude of, for example, crops and forests over time. Also, the present invention may be used to identify subtle variation in altitude of, for example, campaigns or mountains over time. Information of such variation can then be analyzed and used to, for example, forecast the growth state and change trend of crops, which can be in turn compared with data of the same period of the last year, the average of preceding years, and/or the same period of a certain year, so as to recognize growth variation of crops, or to say, variation in spatial distribution and altitude distribution of crops. These data can then be used in statistical analyses about paddy fields, dry lands, plow lands, and shares of different growth momentum levels of dominant crops by region. For example, high-precision altitude data of campaign and mountains acquired at different time points may be compared to disclose subtle changes, which are particularly helpful to monitor and prevent disaster like landslides and avalanches. According to the present invention, the radial velocity of the along-track baseline in the time series may further be used for target extraction and velocity estimation. For example, with the difference in coherence factors of return signals from sea water and sea ice, the present invention can be used to differentiate sea ice from sea water, and then acquire radial velocity information of both sea ice and sea water in virtue of the along-track baseline in the time series, thereby achieving estimation of the corresponding velocity.

Advantageously, the synchronizing device 400 at least comprises a time synchronization module 410, a frequency synchronization module 420, and a space synchronization module 430. The time synchronization module 410 is configured to: trigger timing pulse signals carried by the satellites when started up and obtain frequency differences among the satellites through frequency-synchronized pulses among the satellites thereby achieving time synchronization. Preferably, said startup triggering of timing pulse signals may be achieved using GPS pulse per second. Preferably, as shown in FIG. 1, signals emitted by the master satellite 100 after reflected by the ground become return signals. The return signals pass through the synchronizing device 400 and then arrive at imaging and sensing device 300 where they are processed.

Advantageously, the frequency synchronization module 420 is configured to: use a linear frequency-modulated signal as a synchronizing pulse to switch synchronizing pulse signal processing of the master satellite 100 and the first concomitant satellite 200 or the second concomitant satellite 201 or the third concomitant satellite 101 periodically, so as to obtain phase differences caused by satellite frequency sources, thereby performing phase compensation to achieve frequency synchronization. Preferably, the frequency linear time-variant signal is a chirp signal. Preferably, the master satellite 100, the third concomitant satellite 101, the first concomitant satellite 200, and the second concomitant satellite 201 each have 6 synchronous horn antennas, so as to provide quasi-omnidirectional beam coverage, thereby ensuring near-real-time, all-azimuth, frequency-synchronizing pulse reception. Preferably, the master satellite 100 transmits synchronizing pulses to the third concomitant satellite 101, the first concomitant satellite 200, and the second concomitant satellite 201, respectively. The nature of a chirp signal that its frequency varies linearly over time caused periodical interruption of data acquisition of the synthetic aperture radar of the master satellite 100. In one period, the synchronizing pulses are emitted from the main antenna of the imaging and sensing device 300 of the master satellite 100 to the synchronization-dedicated horn antennas on the third concomitant satellite 101 and/or the first concomitant satellite 200 and/or the second concomitant satellite 201. The third concomitant satellite 101 and/or the first concomitant satellite 200 and/or the second concomitant satellite 201 then each record the pulse and return a short synchronizing pulse to the master satellite 100. The exchanged synchronizing pulse signals are processed, so as to figure out the phase difference incurred by the frequency sources on the concomitant satellites with respect to the master satellite 100. The imaging and sensing device 300 of each satellite then can provide phase compensation correspondingly during its imaging operation, thereby achieving frequency synchronization. Preferably, when frequency linear time-variant signals are used as pulse signals, the frequencies of the frequency sources on the satellite may be regarded as constants. Thus, frequency difference can be extracted from the linear part of the phase difference of the synchronizing signals, thereby accomplishing time synchronization.

Advantageously, the space synchronization module 430 is configured to: point the imaging and sensing device 300 of the first concomitant satellite 200 or the second concomitant satellite 201 or the third concomitant satellite 101 to the same ground target region based on a direction of the imaging and sensing device 300 of the master satellite 100 with respect to the ground target region and the satellite attitude of the first concomitant satellite 200 or the second concomitant satellite 201 or the third concomitant satellite 101, thereby achieving space synchronization. In this way, the imaging and sensing device 300 of the master satellite 100 has its antenna pointed to the imaged region in a side-looking manner. The first concomitant satellite 200, the second concomitant satellite 201, and the third concomitant satellite 101 can point to an imaged region in a small-angle squint-looking manner and observe a ground target. The present invention thereby can at least provide the following technical benefits. First, with temporal and spatial synchronization, the present invention ensures that main beams of two satellites can cover the same ground region at the same time, and ensures that the two satellites receive return signals in synchronized time windows. Second, frequency synchronization helps reduce interferometric phase errors caused by respective frequency drifts of the two satellites.

According to one feasible mode, a third concomitant satellite 101 is located outside the motion trajectories of the first concomitant satellite 200 and the second concomitant satellite 201 to fly with the master satellite 100 in a tandem formation, and is provided with an imaging and sensing device 300 and a synchronizing device 400 as payloads thereof. The third concomitant satellite 101 is located on an orbit adjacent to the master satellite 100, so that the third concomitant satellite 101 defines a long along-track baseline C and a short cross-track baseline D with respect to the master satellite 100. The imaging and sensing device 300 performs optimal interferometric baseline processing based on the first spatial baseline A and the second spatial baseline B as well as the short cross-track baseline D and the long along-track baseline C, so as to obtain terrain elevation information and moving target velocity information while performing high-precision, wide-range imaging. Preferably, the imaging and sensing device 300 generates a long cross-track baseline longer than the short cross-track baseline D and a short along-track baseline shorter than the long along-track baseline C based on the first spatial baseline A and the second spatial baseline B. The long cross-track baseline and the short along-track baseline are then used together with the short cross-track baseline D and the long along-track baseline C in optimal interferometric signal processing, so as to contribute to high-resolution, wide-swath imaging while helping improve measurement of terrain altitude in both precision and range. Preferably, the orbit of the third concomitant satellite 101 and the orbit of the master satellite 100 are separated by at least 120 m. In addition, the distance between the orbit of the third concomitant satellite 101 and the orbit of the master satellite 100 is fixed, as shown in FIG. 2. With the orbit distance given, the spatial baseline defined by the third concomitant satellite 101 with respect to the master satellite 100 can be resolved to obtain the short cross-track baseline D and the long along-track baseline C. In the present invention, the short cross-track baseline D remains certain and fixed when the third concomitant satellite 101 and the master satellite 100 orbit. This can provide precondition and support error analysis for precise orbit determination and baseline measurement of the third concomitant satellite 101 and the master satellite 100.

Preferably, the imaging and sensing devices 300 of the master satellite 100, the third concomitant satellite 101, the first concomitant satellite 200, and the second concomitant satellite 201 receive return signals of signals transmitted to a ground target by the master satellite 100. The imaging and sensing devices 300 obtain plural synthetic aperture radar images of a ground target by means of low-azimuth repeated sampling. Since the imaging and sensing devices 300 acquire images by means of low-azimuth repeated sampling, azimuth Doppler ambiguity can happen. Preferably, azimuth Doppler frequencies and sines of azimuth instantaneous squint angles are in direct proportion and in one-to-one correspondence. When the azimuth repetition rate is low and smaller than the Doppler bandwidth, aliasing appears in the azimuth Doppler spectrum and causes ambiguity. As a result, the azimuth Doppler frequency is no more in direct proportion to the sine of the azimuth instantaneous squint angle, and becomes a mixture of energies pointing to the azimuth instantaneous squint angle. The process of azimuth Doppler ambiguity resolution is about, in the event of aliasing of energies pointing to the azimuth instantaneous squint angle, for every Doppler frequency, extracting a certain energy pointing to the azimuth instantaneous squint angle, and at last rebuilding a Doppler spectrum free of ambiguity by means of stitching. With this approach, the present invention can at least provide the following technical benefits. First, the long along-track baseline C and the short along-track baseline contain radial velocity information, which enables measurement of moving target. Second, the long along-track baseline C and the short along-track baseline can further provide spatial sampling required by azimuth Doppler ambiguity resolution, thereby compensating short sampling time caused by repetition frequency at low azimuth, enabling azimuth Doppler ambiguity resolution.

Preferably, existence of the physical baselines of the first spatial baseline A, the second spatial baseline B, and the third concomitant satellite 101 with respect to the master satellite 100 can introduce space-variant vectors. The spatial baselines of the first spatial baseline A, the second spatial baseline B, and the third concomitant satellite 101 with respect to the master satellite 100 can be resolved to obtain the long cross-track baseline and the short cross-track baseline D. Then through multi-baseline interferometric processing of the long cross-track baseline and the short cross-track baseline D, information of phases introduced into every Doppler frequency by the cross-track baselines can be obtained. With this approach, the present invention can at least provide the following technical benefits. First, phase compensation can be performed based on the obtained phase information before resolution of Doppler ambiguity, so as to improve measurement of terrain altitude in terms of range while satisfying precision of Doppler ambiguity resolution. Second, the multi-baseline interferometric processing of the long cross-track baseline and the short cross-track baseline D can further enhance precision of terrain altitude measurement.

Advantageously, with given orbital parameters of the master satellite 100, orbital parameters of the first concomitant satellite 200 and the second concomitant satellite 201 can be obtained by comparing lengths of the effective cross-track baselines and limit lengths of the cross-track effective baseline of the first spatial baseline A and the second spatial baseline B and adjusting semi-minor axes of flight paths of the first concomitant satellite 200 and the second concomitant satellite 201. The orbital parameters of the third concomitant satellite 101 can be obtained based on requirements of spatial sampling for azimuth Doppler ambiguity resolution and requirements of precision of Doppler ambiguity resolution. Preferably, the orbital parameters of the third concomitant satellite 101 are obtained through the following steps. According to task requirements, orbital parameters of the master satellite 100 are obtained, wherein the eccentricity of orbit of the master satellite is 0. The first concomitant satellite 200 and the second concomitant satellite 201 are identical to the master satellite 100 in terms of semi-major axis, orbit inclination, and right ascension of ascending node. The semi-minor axes and the semi-major axes of the flight paths of the first concomitant satellite 200 and the second concomitant satellite 201 are figured out using Hill equations. Therein, design values of the semi-minor axes of the flight path of the first concomitant satellite 200 and the second concomitant satellite 201 are the baseline requirements of the task. According to the phase difference between the flight paths of the first concomitant satellite 200 and the second concomitant satellite 201, argument of perigee and mean anomaly can be obtained. According to the obtained orbital parameters of all the satellites, the effective cross-track baseline lengths of the first spatial baseline A and the second spatial baseline B in an orbit period are obtained. The next step is to determine whether they are smaller than the critical baseline length of the cross-track effective baseline. If they are not smaller than the critical baseline length of the cross-track effective baseline, the semi-minor axes of the flight paths of the first concomitant satellite 200 and the second concomitant satellite 201 are adjusted, until the effective cross-track baseline lengths of the first spatial baseline A and the second spatial baseline B satisfy requirements. According to the orbital parameters of the master satellite 100, the first concomitant satellite 200, and the second concomitant satellite 201 obtained through the foregoing process, orbital parameters of the third concomitant satellite 101 that allow the long along-track baseline C to meet requirements for spatial sampling for azimuth Doppler ambiguity resolution and allow the short cross-track baseline D to meet requirements for precision if Doppler ambiguity resolution can be figured out. Preferably, assuming that the master satellite 100 has a round orbit, whose eccentricity is 0, according to parameter including the orbit type, the orbital altitude, 6 roots of the master satellite can be obtained using a Hill system of equations. The 6 roots are the orbit semi-major axis, the orbit eccentricity, the orbit eccentricity, the orbit inclination, the right ascension of ascending node, the argument of perigee, and the mean anomaly of the designated epoch. Preferably, Hill equations describing movements of the concomitant satellites are:

$$\begin{cases} X_k = 2A\cos\left(\frac{2\pi t}{T} + \varphi_k\right) + B \\ Y_k = C\sin\left(\frac{2\pi t}{T} + \psi_k\right) \\ Z_k = A\sin\left(\frac{2\pi t}{T} + \varphi_k\right) \end{cases} \quad (1)$$

Therein, when the origin of the coordinate system is the master satellite 100, and the master satellite orbits around the earth, the x axis points to the flight direction of a reference satellite, and the y axis is perpendicular to the orbit plane of the master satellite 100, while the z axis is reverse to the earth's center and points to the master satellite 100. In the equations, $\varphi_k$, $\Psi_k$ indicates the initial location of the $k^{th}$ concomitant satellite in an elliptic orbit configuration, and T represents the orbit period. Preferably, the master satellite 100 is the center of the first concomitant satellite 200 and the second concomitant satellite 201, so B is 0. Preferably, the relative movement between the first concomitant satellite 200 and the second concomitant satellite 201 has an elliptic track in the XZ plane, and the semi-major axis along the velocity direction X is twice as long as the semi-minor axis perpendicular to the velocity direction Z. Preferably, the relative movement between the first concomitant satellite 200 and the second concomitant satellite 201 make a sinusoidal motion in the y axis. The first concomitant satellite 200 and the second concomitant satellite 201 rotate slowly in the elliptic configuration centered on the master satellite 100. Since the first concomitant satellite 200, the second concomitant satellite 201, and the master satellite 100 are all in the same orbit plane, they have identical orbit inclination and right ascension of ascending node. Preferably, the baseline is taken as the design value of the semi-minor axis of the elliptic track formed by the formation flying of the satellites. Since the semi-minor axis of the elliptic track of the relative movement of the formation flying only relates to the semi-major axes and the eccentricities of the satellites, when the semi-major axes are known, the eccentricities of the first concomitant satellite 200 and the second concomitant satellite 201 can be ascertained through the semi-minor axes. Preferably, since the master satellite 100 is located on the major axes of the motion trajectories of the first concomitant satellite 200 and the second concomitant satellite 201, the argument of perigee and mean anomaly of the first concomitant satellite 200 and the second concomitant satellite 201 can be figured out. Preferably, according to the orbital parameters of the master satellite 100, the first concomitant satellite 200, and the second concomitant satellite 201 obtained as described previously, lengths of the first spatial baseline A and the second spatial baseline B of the first concomitant satellite 200 and the second concomitant satellite 201 with respect to the master satellite 100 in an orbit period can be calculated. Then the first spatial baseline A and the second spatial baseline B so obtained are projected onto the earth surface, so as to obtain the effective baselines. The length of the cross-track effective baseline is made to meet the requirements for precision of Doppler ambiguity resolution, and the length of the along-track effective baseline is made to meet the requirements for spatial sampling for azimuth Doppler ambiguity resolution. Then the length of the cross-track effective baseline and the length of the along-track effective baseline should both be smaller than the corresponding critical baseline lengths. The critical baseline length of the cross-track effective baseline is:

$$E_{max} = \frac{\lambda R \tan(\theta - \beta)}{p_r \cos(\theta - \alpha)} \quad (2)$$

The critical baseline length of the along-track effective baseline is:

$$F_{max} = \frac{\lambda R}{p_a \sin\varphi} \quad (3)$$

where, $\lambda$ is the working wavelength of the imaging and sensing device 300, $\theta$ is the angle of view, $\varphi$ is the squint angle, $\alpha$ is the included angle between links of satellite centers of mass of the satellites and the horizontal plane, i.e., the baseline inclination, $\beta$ is the slope of the terrain, R represents the average slant range of the two satellites forming the baseline to the ground target, and $p_r$ and $p_\alpha$ represent the range resolution and the azimuth resolution, respectively. R may be obtained using Equation 4, where $\alpha$ is the semi-major axis of the orbit of the master satellite 100, and $R_e$ is the earth radius:

$$R = \alpha\cos\theta - \sqrt{(\alpha\cos\theta)^2 - \alpha^2 + R_e^2} \quad (4)$$

$p_r$ and $p_\alpha$ be obtained using Equation 5, where c is the velocity of light, $B_w$ represents the signal bandwidth, and D represents the size of the azimuth antenna:

$$\begin{cases} p_r = c/2B_w \\ p_a = D/2 \end{cases} \quad (5)$$

Preferably, the orbital parameters of the third concomitant satellite 101 may be determined according to the design parameters of the orbits of the master satellite 100, the first concomitant satellite 200, and the second concomitant satellite 201 determined as above. The orbit of the third concomitant satellite 101 and the orbit of the master satellite 100 are separated by a fixed distance. Preferably, the third concomitant satellite 101 and the master satellite 100 are arranged into in a tandem formation. Preferably, the longitudinal separation between the third concomitant satellite 101 and the master satellite 100 satisfies the critical baseline length of the along-track effective baseline.

With this approach, the present invention can at least realize the following technical benefits. First, the first concomitant satellite 200, the second concomitant satellite 201, and the master satellite 100 fly in the same orbit plane. The elliptic spatial configuration is passively stable, and the power system is only on for orbit correction or task switching, thereby saving energy. Second, the orbit of the third concomitant satellite 101 and the orbit of the master satellite 100 are close and the two satellites fly in a tandem formation, so as to ensure that the formation of the satellites can obtain the along-track baseline satisfying the requirements for spatial sampling for azimuth Doppler ambiguity resolution anytime, thereby improving imaging efficiency of the system. Third, the spatial configuration formed by the third concomitant satellite 101, the first concomitant satellite 200, the second concomitant satellite 201, and the master satellite 100 is a configuration in the same orbit plane, which can be maintained with reduced fuel consumption. Fourth, the formation used in the present invention is configured to form stable baselines and baseline inclinations, and applicable to interferometric synthetic aperture radar imaging. Fifth, the formation used in the present invention is configured to form plural effective cross-track baselines and plural effective along-track baselines anytime, and the effective cross-track baselines and the effective along-track baselines all satisfy requirements for multi-baseline interferometric processing. Sixth, the effective cross-track baselines formed by the formation off the present invention anytime satisfy requirements for precision of Doppler ambiguity resolution, and the effective along-track baselines satisfy requirements for spatial sampling for azimuth Doppler ambiguity resolution, thereby allowing the synthetic aperture radar system to provide high-precision, wide-range imaging anytime with enhanced precision and range of ground altitude measurement.

Advantageously, when the third concomitant satellite 101 is synchronized through the synchronizing device 400, the first spatial baseline A, the second spatial baseline B, the short cross-track baseline D, and the long along-track baseline C define an along-track baseline and a cross-track baseline in time series. The imaging and sensing device 300 based on the along-track tangents in time series acquires information about variation of velocity of a moving target over time. The imaging and sensing device 300 acquires information about variation of ground elevation over time based on the cross-track baselines in time series.

Preferably, during synthetic aperture radar interferometric imaging according to the long cross-track baseline and the short cross-track baseline D, the phase difference obtained from the interferogram is the phase principal value between [$-\pi$, $\pi$] after unknown integer periods of wind-up. The winding phases have to be restored to show their actual phase differences, and the process is called phase unwrapping. Preferably, the imaging and sensing device 300 obtains information about synchronization in terms of time and frequency based on the along-track baseline and the cross-track baseline in time series, thereby calibrating signals it receives. The imaging and sensing device 300 then performs phase compensation based on the calibrated information, and uses the short cross-track baseline to perform phase unwrapping on the long cross-track baseline, thereby further enhancing precision of terrain altitude measurement. With this approach, the present invention can at least realize the following technical benefit. Since the short cross-track baseline D is less precise for altitude measurement, phase unwrapping based on the long cross-track baseline may have errors, but the present invention uses the along-track baseline and the cross-track baselines in time series to obtain synchronization information about time and frequency, thereby calibrating the received signals, and uses the long and short cross-track baselines to perform phase unwrapping, so as to enhance precision in both phase unwrapping and terrain altitude measurement, thereby being able to recognize subtle variation in terms of elevation and velocity over time in a ground region.

According to one feasible mode, the imaging and sensing device 300 further comprises a measuring device 310 configured to measure satellite attitude parameters of the master satellite 100, the first concomitant satellite 200, the second concomitant satellite 201, and the third concomitant satellite 101 on a real-time basis, and to perform precise orbit determination so as to acquire the first spatial baseline A, the second spatial baseline B, the long along-track baseline C, and the short cross-track baseline D with high precision. Preferably, the measuring device 310 at least comprises a GPS receiver for attitude measurement. The GPS receiver performs the following steps: pre-processing raw data, primarily including decoding ephemeris data and synchronizing data; acquiring location parameters of the imaging and sensing device 300 using a differential positioning algorithm; using location parameters of the antennas of the imaging and sensing device 300 to obtain the initial value of integer ambiguity, using Kalman filter and recursive search to figure out the precise value of integer ambiguity, and using the carrier phase to obtain precise coordinates; using the obtained precise coordinate value to obtain the inter-satellite baseline vector, and using the inter-satellite baseline vector to obtain attitude parameters of the antennas of the imaging and sensing device 300.

Preferably, the GPS receiver is a high-precision, double-frequency GPS receiver. Preferably, the high-precision, double-frequency GPS receiver integrated therein a GPS occultation receiver. Preferably, the GPS receiver pre-processes the raw data it receives, and then performs single point positioning coordinate computation. Afterward, it performs double-difference positioning computation to figure out the coordinates of the moving coordinate state, thereby acquiring coordinates of rough locations of the antennas of the imaging and sensing device 300. Preferably, in order to acquire precise coordinates of the antennas of the imaging and sensing device 300, the GPS receiver needs to use carrier phases having centimeter-grade wavelengths and millimeter-grade range errors for range measurement. Since carrier signals are periodic sinusoidal signals, when the measured range is greater than the wavelengths, integer ambiguity can happen. Preferably, the GPS receiver obtains the initial value of integer ambiguity based on the rough location coordinates, and then uses Kalman filter and recursive search to figure out the precise value of integer ambiguity.

Preferably, after the master satellite 100 obtains the attitude parameters of the antennas of the imaging and sensing device 300, the GPS receiver based on the orbital parameters of the master satellite 100, the third concomitant satellite 101, the first concomitant satellite 200, and the second concomitant satellite 201, and connected to the GPS constellation, at least acquires priori information about lunisolar gravitational perturbation, solar radiation pressure perturbation and atmospheric drag perturbation, so as to build an orbit perturbation model for the satellite formation to eliminate effects of the perturbation on baseline measurement. The GPS receiver, based on the attitude parameters of the antennas of the imaging and sensing device 300 and the orbit determination result obtained using the orbit perturbation model of the formation, performs differential carrier phase measurement, so as to obtain the first spatial baseline A, the second spatial baseline B, the long along-track baseline C, and the short cross-track baseline D.

Preferably, the effects of perturbation of non-spherical of the Earth, solar radiation pressure perturbation, and atmospheric drag perturbation on the satellites are unignorably, and may be taken as model noise to be considered together with priori information for estimation. Preferably, the orbit perturbation model reflects the linear accumulation of acceleration of effects of perturbation of non-spherical of the Earth, solar radiation pressure perturbation and atmospheric drag perturbation on movement of the satellites. Preferably, the differential carrier phase measurement method is about differentiating the path delay of the two satellites and errors in orbit determination caused by algorithms so as to eliminate most common error components of the two satellites. By differentiating the orbit determination results of the two satellites, the corresponding baseline vectors can be obtained. With this approach, the present invention can at least realize the following technical benefit. The GPS receiver can eliminate most common error components of the two satellites, and then the results are optimized using algorithms so that an orbit perturbation model can be built to provide corresponding compensation, thereby measuring inter-satellite baselines and attitude parameters of the satellites precisely.

Advantageously, the imaging and sensing device 300 can further use the measuring device 310 to obtain priori information of a ground target region. The imaging and sensing device 300 adjusts the antenna angles of the imaging and sensing devices 300 of the master satellite 100, the third concomitant satellite 101, the first concomitant satellite 200, and the second concomitant satellite 201 based on the latitude information of the ground target region, so as to maintain them at the same elevation ambiguity, thereby enhancing consistency of precision ground elevation measurement for different latitudinal regions. Preferably, elevation ambiguity reflects sensitivity of interferometric phases to elevation variation. When the cross-track baseline is long, the elevation ambiguity is small, and interferometric phases are sensitive to elevation variation. If the cross-track baseline is excessively short, the interferometric phases are less sensitive to elevation variation, leading to decreased precision of terrain altitude measurement. Preferably, elevation ambiguity is in direct proportion to the sine of the azimuth instantaneous squint angle, and, since the effective baseline obtained by projecting the spatial baseline onto the ground has different length at different latitudes due to earth rotation, elevation ambiguity. Can be adjusted by adjusting of the antenna angles of the imaging and sensing devices 300. With this approach, the present invention can at least realize the following technical benefit. The master satellite 100 can acquire the latitude information of an observed region on the ground according to priori information of the GPS constellation, adjust antenna angles accordingly, so as to maintain the same elevation ambiguity, thereby enhancing consistency of precision of elevation measurement in different latitudinal regions.

Advantageously, when the terrain altitude of the ground target region obtained based on priori information shows a large amplitude of variation, adjust the antenna angles of the imaging and sensing devices 300 of the master satellite 100, the third concomitant satellite 101, the first concomitant satellite 200, and the second concomitant satellite 201 can be adjusted to keep a second elevation ambiguity that is constant and different from the first elevation ambiguity, so that the SAR system performs imaging at least twice with the different elevation ambiguities. Preferably, after imaging is performed while the antenna angles of the imaging and sensing devices 300 of the master satellite 100, the third concomitant satellite 101, the first concomitant satellite 200, and the second concomitant satellite 201 keep the same first elevation ambiguity, of the terrain altitude of the ground observed region obtained based on the priori information shows a relatively large amplitude of variation, the antenna angles of the imaging and sensing devices 300 of the master satellite 100, the third concomitant satellite 101, the first concomitant satellite 200, and the second concomitant satellite 201 are adjusted to keep a second elevation ambiguity that is constant and different from the first elevation ambiguity, so that the imaging and sensing device 300 performs imaging at least twice with different elevation ambiguities. When the terrain in the imaged region has obvious relief, principal values of phases may become discontinued, leading to large phase unwrapping errors. Preferably, the imaging and sensing device 300 images with the different elevation ambiguities obtained through adjustment of the antennas so as to check consistency of phase unwrapping and the differences of the same imaged region between two times of imaging, thereby reducing phase unwrapping errors. With this approach, the present invention can at least realize the following technical benefits: to image a steep terrain with obvious relief, imaging may be performed with different elevation ambiguities, so as to reduce phase unwrapping errors, improving relative precision, and in turn improve measurement precision of measurement of terrain altitudes.

The term "module" as used herein describes any hardware, software, or any combination thereof capable of performing the functions associated with the "module".

Although the invention has been described in detail, modifications within the spirit and scope of the invention will be apparent to those skilled in the art. Such modifications are also considered part of this disclosure. In view of the foregoing discussion, the relevant knowledge in the art, and the references or information discussed above in connection with the background, all of which are incorporated herein by reference, no further description is deemed necessary. Furthermore, it is to be understood that various aspects of the present invention and parts of various embodiments may be combined or interchanged, in whole or in part. Moreover, those of ordinary skill in the art will appreciate that the foregoing description is by way of example only, and is not intended to limit the present invention.

What is claimed is:

1. A remote sensing system, or particularly a satellite-formation-based remote sensing system, wherein comprising:
   a master satellite provided with a Synthetic-aperture radar (SAR) system as a payload thereof, a first concomitant satellite, and a second concomitant satellite,
   wherein the first concomitant satellite and the second concomitant satellite fly around the master satellite, and the master satellite is located on major axes of motion trajectories of the first concomitant satellite and the second concomitant satellite, so as to define a first spatial baseline and a second spatial baseline that have an identical cross-track baseline component; and
   a third concomitant satellite that is located outside the motion trajectories of the first concomitant satellite and the second concomitant satellite to fly with the master satellite in a tandem formation, and is provided with a first imaging and sensing device and a first synchronizing device as payloads thereof, wherein the third concomitant satellite is located on an orbit adjacent to the master satellite, so that the third concomitant satellite defines a long along-track baseline and a short cross-track baseline with respect to the master satellite, wherein the first imaging and sensing device performs optimal interferometric baseline processing based on the first spatial baseline and the second spatial baseline as well as the short cross-track baseline and the long along-track baseline, so as to obtain terrain elevation information and moving target velocity information while performing high-precision, wide-range imaging.

2. The system of claim 1, wherein the master satellite is provided with a second imaging and sensing device, and a second synchronizing device as payloads thereof, wherein the second synchronizing device forms the first spatial baseline and the second spatial baseline in time series based on synchronization in terms of time, frequency, and space; and wherein the second imaging and sensing device acquires spatiotemporal features of variation of a ground region according to the first spatial baseline and the second spatial baseline.

3. The system of claim 1, wherein the first imaging and sensing device further comprises a measuring device configured to measure satellite attitude parameters of the master satellite, the first concomitant satellite, the second concomitant satellite, and the third concomitant satellite on a real-time basis, and to perform precise orbit determination so as to acquire the first spatial baseline, the second spatial baseline, the long along-track baseline, and the short cross-track baseline with high precision.

4. The system of claim 3, wherein the first imaging and sensing device is further configured to obtain priori information about a ground target region using the measuring device, and to adjust antenna angles of the second imaging and sensing devices of the master satellite, the third concomitant satellite, the first concomitant satellite, and the second concomitant satellite based on latitude information of the ground target region, so as to keep a constant elevation ambiguity, thereby enhancing consistency of precision for measuring ground elevations in regions at different latitudes.

5. The system of claim 4, wherein when terrain altitude of the ground target region obtained based on the priori information shows a large amplitude of variation, the antenna angles of the second imaging and sensing device of the master satellite, the first imaging and sensing device of the third concomitant satellite, a third imaging and sensing device of the first concomitant satellite and a fifth imaging and sensing device of the second concomitant satellite are adjusted to keep a second elevation ambiguity that is constant and different from the first elevation ambiguity, so that the SAR system performs at least twice imaging with the two different elevation ambiguities.

6. The system claim 1, wherein when the third concomitant satellite is synchronized by virtue of the first synchronizing device, the first spatial baseline, the second spatial baseline, the short cross-track baseline, and the long along-track baseline define an along-track baseline and a cross-track baseline in time series, wherein the first imaging and sensing device acquires variation information of velocity over time of a moving target based on an along-track tangent in time series, and acquires variation information of the ground elevations over time based on the cross-track baselines in time series.

7. The system of claim 1, wherein based on orbital parameters of the master satellite orbital parameters of the first concomitant satellite and the second concomitant satellite are obtained by comparing lengths of the effective cross-track baselines and limit lengths of the cross-track effective baseline of the first spatial baseline and the second spatial baseline and adjusting a semi-minor axes of flight paths of the first concomitant satellite and the second concomitant satellite, and orbital parameters of the third concomitant satellite are obtained based on requirements of spatial sampling for azimuth Doppler ambiguity resolution and requirements of precision of Doppler ambiguity resolution.

8. The system of claim 2, wherein the second synchronizing device at least comprises a time synchronization module a frequency synchronization module, and a space synchronization module, wherein the time synchronization module is configured to: trigger timing pulse signals carried by the satellites when started up and obtain frequency differences among the satellites through frequency-synchronized pulses among the satellites thereby achieving time synchronization.

9. The system of claim 8, wherein the frequency synchronization module in the second synchronizing device is configured to: use a linear frequency-modulated signal as a synchronizing pulse to switch synchronizing pulse signal processing of the master satellite and the first concomitant satellite or the second concomitant satellite or the third concomitant satellite periodically, so as to obtain phase differences caused by satellite frequency sources, thereby performing phase compensation to achieve frequency synchronization.

10. The system of claim 8, wherein the space synchronization module in the second synchronizing device is configured to: point a third imaging and sensing device of the first concomitant satellite or a fourth imaging and sensing device of second concomitant satellite or the third concomitant satellite to the same ground target region based on a direction of the second imaging and sensing device of the master satellite with respect to the ground target region and the satellite attitude of the first concomitant satellite or the second concomitant satellite or the third concomitant satellite, thereby achieving space synchronization.

11. A satellite-borne Synthetic-aperture radar constellation system, wherein comprising: a master satellite provided with an SAR system as a payload thereof: at least a pair consisting of first concomitant satellite and second concomitant satellite flying around the master satellite, wherein the first concomitant satellite and the second concomitant satellite fly around the master satellite and the master satellite is located on major axes of motion trajectories of the first concomitant satellite and the second concomitant satellite so as to define a first spatial baseline and a second spatial baseline having identical cross-track baseline components, wherein the first concomitant satellite and the second concomitant satellite form a passively stable configuration with respect to the master satellite in a centrosymmetric way, so that the first concomitant satellite defines the first spatial baseline with respect to the master satellite, and the second concomitant satellite defines the second spatial baseline with respect to the master satellite, and wherein the first spatial baseline and the second spatial baseline are identical in terms of length and are opposite in terms of phase; and a third concomitant satellite located outside a flying orbit of the first concomitant satellite and the second concomitant satellite and is on an orbit adjacent to the master satellite so as to fly with the first master satellite in a tandem formation, thereby defining a long along-track baseline and a short cross-track baseline with respect to the master satellite, wherein the SAR system defines a long vertical baseline greater than the short cross-track baseline in terms of length and a short horizontal baseline smaller than the long along-track baseline in terms of length based on the first spatial baseline and the second spatial baseline, and performs optimal interferometric signal processing combined with the short cross-track baseline, and the long along-track baseline, so as to perform high-resolution, wide-swath imaging with improved terrain altitude measurement in terms of precision and range.

12. The system of claim 11, wherein after orbital parameters of the master satellite, the third concomitant satellite, the first concomitant satellite, and the second concomitant satellite are obtained, the master satellite acquires attitude parameters of an SAR radar antenna using a measuring device, so as to perform precise orbit determination on the master satellite, the third concomitant satellite, the first concomitant satellite, and the second concomitant satellite, thereby acquiring the first spatial baseline, the second spatial baseline, and the long along-track baseline and the short cross-track baseline with high precision, wherein the measuring device at least comprises a Global Positioning System (GPS) receiver that performs attitude measurement through steps of:

pre-processing raw data, primarily including decoding ephemeris data and synchronizing data;

acquiring location parameters of the SAR radar antenna using a differential positioning algorithm;

obtaining an initial value of integer ambiguity using location parameters of the SAR radar antenna, figuring out a precise value of the integer ambiguity by means of Kalman Filter and recursive search, and obtaining precise coordinates using carrier phases; and obtaining an inter-satellite baseline vector using the obtained precise coordinates, and obtaining the attitude parameter of the SAR radar antenna using the inter-satellite baseline vector.

13. A satellite remote sensing system, comprising a master satellite provided with a Synthetic-aperture radar system as a payload thereof, a third concomitant satellite, and at least a pair consisting of first concomitant satellite and second concomitant satellite flying around the master satellite, wherein after the master satellite obtains attitude parameters of SAR radar antenna, Global Positioning System receiver at least acquires priori information about lunisolar gravitational perturbation, solar radiation pressure perturbation, and atmospheric drag perturbation based on orbital parameters of the master satellite, the third concomitant satellite, the first concomitant satellite and the second concomitant satellite and its connection with a GPS constellation, and building an orbit perturbation model of a constellation system so as to eliminate effects of the perturbations on baseline measurement; and wherein the GPS receiver define a first spatial baseline, a second spatial baseline, a long along-track baseline, and a short cross-track baseline based on an orbit determination result obtained through the orbit perturbation model of the constellation system and the attitude parameters of the SAR radar antenna.

* * * * *